United States Patent [19]

Brabston et al.

[11] Patent Number: 5,252,266
[45] Date of Patent: Oct. 12, 1993

[54] CONTROL OF THE HARDENING OF BINDERS AND CEMENTS

[76] Inventors: William N. Brabston, 109 Plantation Dr.; Philip G. Malone, 107 Fox Run La., both of Vicksburg, Miss. 39180

[21] Appl. No.: 908,280

[22] Filed: Jul. 2, 1992

[51] Int. Cl.$^5$ ............................................. H05B 7/00
[52] U.S. Cl. ................................. 264/22; 106/723; 204/130; 204/153; 264/27
[58] Field of Search ............... 264/22, 27; 204/130, 204/153; 106/723

[56] References Cited

U.S. PATENT DOCUMENTS

| | | | |
|---|---|---|---|
| 1,808,762 | 6/1931 | Brund et al. | 264/27 |
| 2,302,913 | 11/1942 | Reimers | 204/130 |
| 2,319,105 | 5/1943 | Billner | 264/27 |
| 2,500,866 | 3/1950 | Ramsay | 264/27 |
| 2,683,916 | 7/1954 | Kelly | 264/27 |
| 2,841,856 | 7/1958 | Gelbman | 264/27 |
| 2,910,372 | 10/1959 | Ruskin | 264/22 |
| 3,398,071 | 8/1968 | Bagno | 204/130 |
| 4,440,605 | 4/1984 | Hilbertz | 204/130 X |

FOREIGN PATENT DOCUMENTS

| | | | |
|---|---|---|---|
| 2267864 | 11/1975 | France | 264/27 |
| 24090 | 7/1978 | Japan | 264/27 |
| 262605 | 12/1985 | Japan | 264/27 |
| 312840 | 11/1971 | U.S.S.R. | 264/27 |
| 353921 | 11/1972 | U.S.S.R. | 264/27 |
| 366174 | 3/1973 | U.S.S.R. | 106/723 |
| 571454 | 10/1977 | U.S.S.R. | 106/723 |
| 1143735 | 3/1985 | U.S.S.R. | 264/27 |
| 1158552 | 5/1985 | U.S.S.R. | 264/27 |

*Primary Examiner*—Karen Aftergut
*Attorney, Agent, or Firm*—Luther A. Marsh

[57] ABSTRACT

The setting or hardening reaction of binders and cements of the types which are alkali-activated or acid-activated is controlled by forming a paste of the binder or cement and a salt which, under electrolysis forms the activating agent, placing the paste in a mold, providing two electrodes, one of which may be the mold, in contact with the paste, and passing an electric current between the electrodes to generate the activating agent by electrolysis.

9 Claims, No Drawings

CONTROL OF THE HARDENING OF BINDERS AND CEMENTS

The present invention pertains to the control of the hardening or setting reaction of binders and cements, particularly those binders and cements that require specific alkaline or acidic conditions in order to initiate hardening.

BACKGROUND OF THE INVENTION

Heretofore the use of binders and cements of the type that require specific alkaline or acidic conditions for initiation of the setting reaction has involved mixing of an alkaline or acidic component directly into the binder or cement prior to placement of the material. As the reaction times of these binders and cements are very short, often less than one hour, setting may occur before placement of the material is completed, resulting in serious flaws in the product and/or damaged or clogged mixing equipment.

Casting of hollow articles with binders or cements of this type normally involves rotating the mold to hold the paste against the interior surface of the mold until the paste has hardened. This, however, involves additional equipment and expense.

It is a primary object of the invention to control the hardening or setting reaction of binders or cements of the type which require specific alkaline or acidic conditions to initiate the reaction so that the material may be handled and placed prior to the beginning of the setting reaction.

It is also an object of the present invention to control the hardening or setting reaction of such binders and cements which facilitates the casting of hollow items without the need for rotation of the mold.

SUMMARY OF THE INVENTION

The above and other objects of the invention which will become apparent hereinafter are achieved by the provision of a method of controlling the setting reaction of either an alkali-activated cement or an acid-activated cement which method includes the steps of mixing the cement with a solution of a salt which, under electrolysis yields an activating agent for the selected cement, e.g., sodium chloride with an alkali-activated cement or sodium phosphate with an acid-activated cement; placing the resultant paste in a mold; providing a first electrode within a volume of the paste at which it is desired that the paste remain soft; providing a second electrode within a volume of the cement where setting of the cement is desired; and passing a current through the paste between the two electrodes with the direction of current flow being such as to cause formation of the activating agent at the second electrode, the cathode for an alkali-activated cement or the anode for an acid-activated cement. It is contemplated that the mold itself may function as the second electrode. Upon completion of the setting reaction, the paste remaining in the vicinity of the first electrode may be poured off or otherwise removed to create a cast hollow article.

For a more complete understanding of the invention and the objects and advantages thereof, reference should be had to the following detailed description wherein preferred embodiments of the invention are described.

DESCRIPTION OF THE PREFERRED EMBODIMENTS

The present invention provides for the control of the setting or hardening reaction of those binders and cements that require specific alkaline or acidic conditions to initiate the reaction by the use of electrolysis to create the required alkaline or acidic condition within a paste formed by mixing the binder or cement with an ingredient which, under electrolysis, dissociates into an alkaline solution in the vicinity of the cathode or negative electrode and an acidic solution at the anode or positive electrode. When an alkaline-activated binder or cement is used, the cathode, which may be the mold itself, is placed in the area of the paste in which hardening is desired while the anode is placed in an area in which the paste is to remain soft and perhaps, later removed. The position of the electrodes is reversed when an acid-activated binder or cement is employed.

In a test of the invention, an alkaline-activated slag cement was mixed with a 10% to 35% solution of sodium chloride to form a thick paste. Aluminum electrodes were placed in the paste, the cathode being located in the area in which hardening was desired and the anode, in an area to remain soft. A direct current sufficient to cause electrolysis, for example 0.5 ampere at 12 volts, was applied to the electrodes and passed through the paste. The volume of the paste through which the electric current passed at the negative electrode became highly alkaline, causing the slag grains to bond together within this volume. The volume of the paste through which the current passed at the positive electrode became highly acidic, preventing any bond formation in this latter volume. The volume of alkaline paste produced is controlled by the amount of electrolysis that takes place and the rate of diffusion of alkali in the paste.

The electrolytic technique described herein may be employed to form complex, hollow masses with slag/salt paste by filling a metal mold with the paste and passing an electric current between the mold and another electrode placed in the center of the paste. If an alkaline-activated paste is used, the mold serves as the cathode so that the alkaline condition is created in the volume of paste adjacent thereto, which condition promotes the hardening or setting reaction of the paste within this region. The central portion of the paste mass does not harden and may be poured, pumped or washed out to leave a hollow cast shell that duplicates the interior shape of the metal mold. It will be apparent that no rotation of the mold is required in this process.

While sodium chloride was employed as the salt in the above example, it will be apparent that other salts may be used. Other alkali-activated silicates may be used in place of the slag glass-based cement. Alternate materials would include fired clay, fly ash, volcanic ash and various glassy metallurgical wastes. In addition, the described method is also applicable to the control of the setting of acid-activated cements such as phosphoric acid-metal oxide (e.g. zinc oxide) cements using a phosphate salt such as sodium phosphate in a paste formed with zinc oxide and with the positions of the anode and cathode reversed so that the activating agent, such as phosphoric acid is formed at the anode to effect hardening of the cement paste in the vicinity thereof. Aggregate, micro-aggregate, filler or reinforcing materials may be added to the paste prior to electrolysis. The tests described above were performed at room temperature but the process of the present invention will also work at higher or lower temperatures. Also, while aluminum electrodes were used in the test, electrodes of other conductive materials may be employed.

While a preferred embodiment of the invention has been described in detail herein, it will be understood that changes and additions may be had therein or thereto without departing from the spirit of the invention. Reference should, accordingly, be had to the appended claims in determining the true scope of the invention.

What is claimed is:

1. A method of controlling the setting of a cement which is selected from the group consisting of alkali-activated cements and acid-activated cements, comprising the steps of:
   mixing the selected cement with a solution of a salt which yields, under electrolysis, an activating agent for the selected cement, to thereby form a soft paste;
   placing the soft paste in a mold;
   providing a first electrode in a volume of the soft paste where it is desired that the paste remain soft;
   providing a second electrode in a volume of the soft paste where setting of the cement in the paste is desired; and
   passing a current having a direction of flow through the paste between the first and second electrodes, the direction of current flow being such as to cause formation of the activating agent at the second electrode to thus cause the setting of the cement in the volume of the paste at the second electrode while also allowing the volume of the paste at the first electrode to remain soft.

2. The method of claim 1 wherein the selected cement is an alkali-activated cement selected from the group consisting of slag glass-based cement, fired clay, fly ash, and glassy metallurgical wastes.

3. The method of claim 2 wherein the salt solution is a 10% to 35% solution of sodium chloride.

4. The method of claim 1 wherein the current is a direct current of about 0.5 ampere at 12 volts.

5. The method of claim 1 wherein the selected cement is an acid-activated cement with zinc oxide.

6. The method of claim 5 wherein the salt is sodium phosphate.

7. A method of controlling the setting of metal oxide-based cement, comprising:
   mixing the cement with an acid-generating salt solution to form a soft paste;
   placing the soft paste in a mold;
   inserting a cathode in the soft paste in the mold in an area where it is desired that the paste remain soft;
   inserting an anode in the soft paste in the mold in an area where hardening of the soft paste is desired; and
   passing a current through the soft paste between the cathode and the anode add to thus cause the setting of the cement in the area of the paste at the anode while also allowing the area of the paste at the cathode to remain soft.

8. The method of claim 7 wherein the step of mixing the cement with the salt solution to form the soft paste further comprises mixing zinc oxide as the cement with sodium phosphate as a salt in the salt solution to form the soft paste.

9. The method of claim 7 wherein the step of passing a current through the soft paste includes passing a direct current of approximately 0.5 ampere at 12 volts through the paste.

* * * * *